United States Patent [19]

Ueno et al.

[11] Patent Number: 4,926,245
[45] Date of Patent: May 15, 1990

[54] QUADRATURE AMPLITUDE MODULATION PRESERVING ONE CHANNEL ZERO CROSSING FOR VIDEO TELEPHONE

[75] Inventors: Yutaka Ueno, Kanagawa, Japan; Lawrence D. Emmons, Grass Valley, Calif.; Koji Kaneko; Takayoshi Semasa, both of Kanagawa, Japan

[73] Assignee: Luma Telecom, Inc., Santa Clara, Calif.

[21] Appl. No.: 212,537

[22] Filed: Jun. 28, 1988

[51] Int. Cl.⁵ ............................................. H04N 11/12
[52] U.S. Cl. ............................................ 358/12; 358/15
[58] Field of Search ....................... 358/12, 15, 16, 14, 358/310, 75, 85, 281

[56] References Cited

U.S. PATENT DOCUMENTS

| | | | |
|---|---|---|---|
| 3,813,483 | 5/1974 | Kurosawa et al. | 358/281 |
| 4,335,393 | 6/1982 | Pearson | 358/14 |
| 4,675,721 | 6/1987 | Dirr | 358/12 |

FOREIGN PATENT DOCUMENTS

| | | | |
|---|---|---|---|
| 3319587 | 1/1985 | Fed. Rep. of Germany | 358/12 |
| 40514 | 3/1979 | Japan | 358/14 |
| 281696 | 12/1986 | Japan . | |
| 1158918 | 7/1969 | United Kingdom | 358/14 |

Primary Examiner—John W. Shepperd
Attorney, Agent, or Firm—Townsend and Townsend

[57] ABSTRACT

The present invention provides a QAM modulation scheme compatible with a single channel demodulator. The inphase (I) channel is provided with luminance information encoded on a series of sine wave symbols. The quadrature (Q) channel is used for color difference values with a sine or cosine symbol being used for each color difference value. Alternate ones of these color difference symbols are inverted so that, on the average, their effect on the I channel zero-crossings simply cancels out. Thus, when sent to a single channel demodulator which expects a black and white picture, the quadrature channel will be filtered out; leaving luminance information which will be decoded as a black and white picture. The color information does not disturb the zero crossings of the luminance signal on an averaged basis, allowing the carrier recovery phase lock loop to maintain synchronization for demodulation purposes. When received by a QAM demodulator, the color difference values are recovered on the Q channel, to give a color picture. In one embodiment, the cosine symbols on the channel are offset with a positive or negative DC value, depending on whether the symbol is inverted, to shift the Q channel zero-crossings so they are aligned with the I channel zero-crossings.

10 Claims, 3 Drawing Sheets

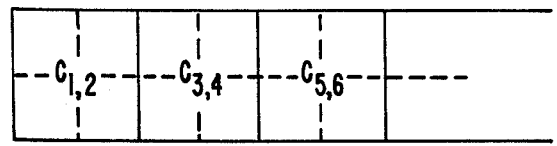
FIG._1A.   LUMINANCE
FIG._1B.   CHROMINACE
FIG._1C.   COLOR DIFFERENCE SIGNALS
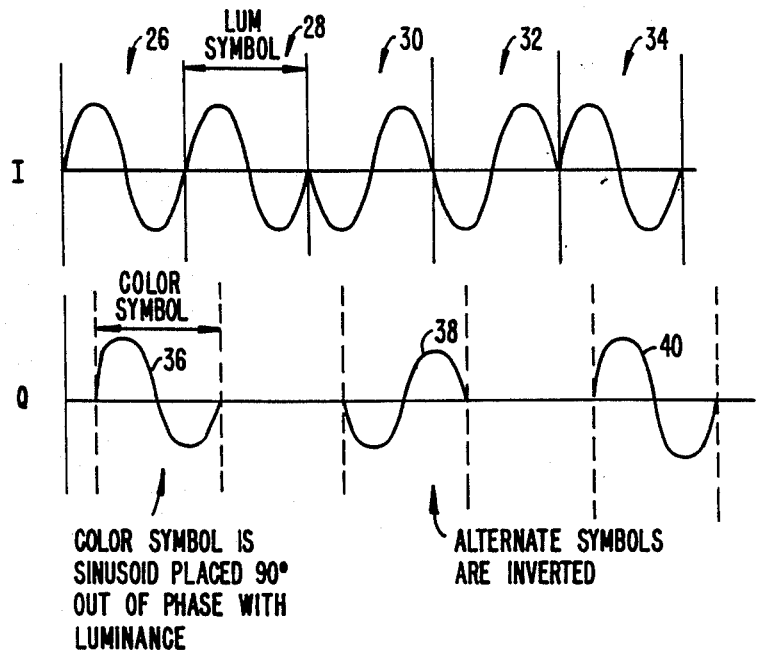
COLOR SYMBOL IS SINUSOID PLACED 90° OUT OF PHASE WITH LUMINANCE
ALTERNATE SYMBOLS ARE INVERTED
FIG._4.

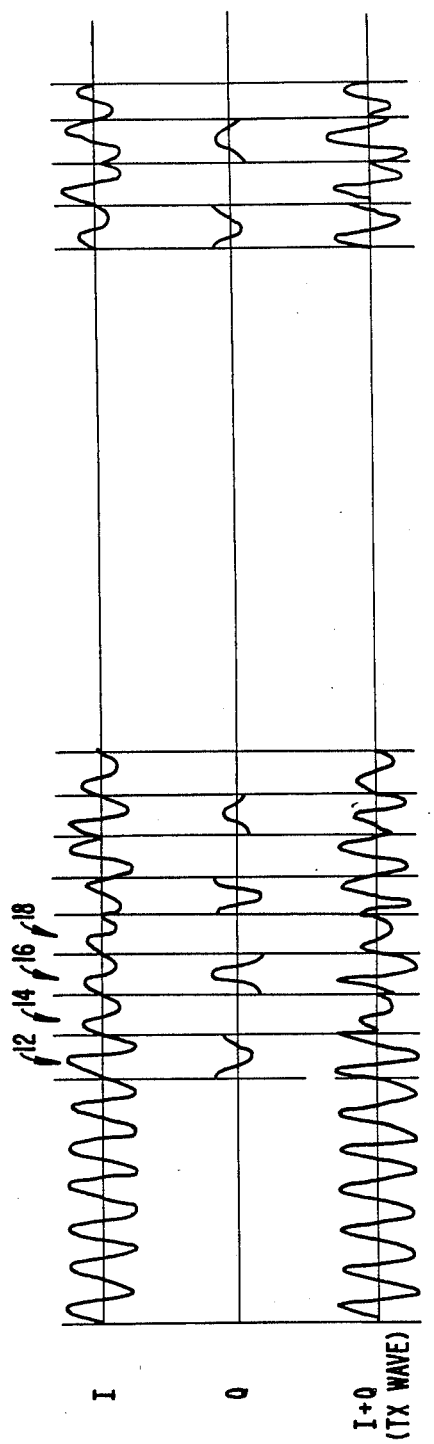
FIG._2B.
FIG._2A.

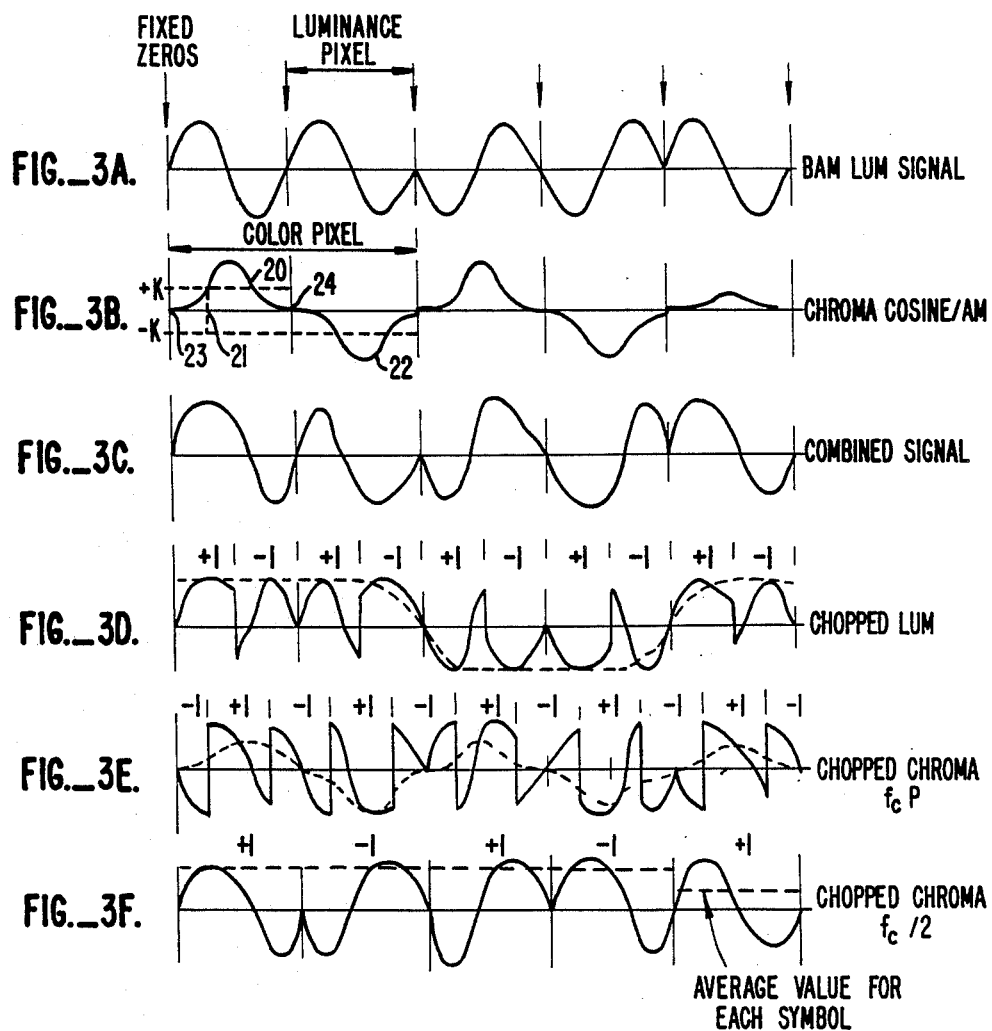

QUADRATURE AMPLITUDE MODULATION PRESERVING ONE CHANNEL ZERO CROSSING FOR VIDEO TELEPHONE

BACKGROUND

The present invention relates to modulation schemes for video telephones using quadrature amplitude modulation.

When a single channel of data is transmitted over a telephone line using a sine wave signal, the zero crossings of the sine wave can be used for synchronization. Such a system is shown in U.S. Pat. No. 4,739,413 which describes a video-optimized modulation scheme of Luma Telecom, Inc. The amplitude and phase of each cycle of a sine wave is modulated to transmit the video gray scale or luminance information. This modulation does not affect the zero crossings in between symbols, which can be used by a simple chopper demodulator to recover the carrier.

The amount of black and white data transmitted can be increased by adding another channel using quadrature amplitude modulation (QAM). This allows more gray scale data to be sent or allows color information to be sent. However, because the two channels of the QAM signal are out of phase, the zero crossings of each channel will be altered by the data on the other channel. Thus, a more complicated demodulation scheme is typically necessary.

It is desirable to have a QAM system which can provide an increased amount of luminance data (gray scale) or color data and would be compatible with existing demodulators which use a chopper demodulator for a single channel for black and white (gray scale) pictures.

SUMMARY OF THE INVENTION

The present invention provides a QAM modulation scheme compatible with a single channel demodulator. The inphase (I) channel is provided with luminance information encoded on a series of sine wave symbols. The quadrature (Q) channel is used for color difference values with a sine or cosine symbol being used for each color difference value. Alternate ones of these color difference symbols are inverted so that, on the average, their effect on the I channel zero-crossings simply cancels out. Thus, when sent to a single channel demodulator which expects a black and white picture, the quadrature channel will be filtered out; leaving luminance information which will be decoded as a black and white picture. The color information does not disturb the zero crossings of the luminance signal on an averaged basis, allowing the carrier recovery phase lock loop to maintain synchronization for demodulation purposes. When received by a QAM demodulator, the color difference values are recovered on the Q channel, to give a color picture.

In one embodiment, cosine symbols coincident in time with the sine symbols on the I channel are used for the color difference values. These cosine symbols are produced for only every other cycle. This preserves the zero crossings on the I channel by causing the Q channel to go to zero at the beginning and end of every symbol. In order to reduce the interference from this abrupt change to zero, the maximum amplitude of the Q channel is made to be approximately one-half the maximum amplitude of the I channel. Although the alternate cosine symbols correspond to different pixels or group of pixels, these pixels will be adjacent in the video picture and therefore usually will have the same or a similar color value. Alternate cosine symbols will thus have the same or a similar amplitude, so that they are substantially cancelled out on the average.

In an alternate method, two identical cosine symbols are used for the color difference value for each group of pixels, to give a redundant cosine symbol, with one of the symbols being inverted. This ensures that on the average, there will be total cancellation of the cosine symbols so that it will not interfere with the demodulation of the I channel by a single channel demodulator. By adding a constant value to the cosine signal, the zero crossings are shifted to coincide with the zero crossings of the sine signal on the I channel.

In yet another embodiment, the color difference values are assigned to sine symbols which are offset from the sine symbols on the I channel. Alternate sine symbols are inverted, and the sine symbols only appear in every other interval. Thus, the zero crossings between occupied intervals are preserved, and the inversion of every other sine symbol causes the average shift of the inphase zero crossings to be zero.

For a fuller understanding of the nature and advantages of the invention, reference should be made to the ensuing detailed description taken in conjunction with the accompanying drawings.

BRIEF DESCRIPTION OF THE DRAWINGS

FIGS. 1A–1C are diagrams showing the assignment of luminance and color difference values to pixels;

FIGS. 2A and 2B are diagrams of a first embodiment of the QAM modulation scheme according to the present invention using cosine symbols for alternate intervals;

FIGS. 3A–F are diagrams of a second modulation scheme using redundant cosine symbols; and FIG. 4 is a diagram of a third modulation scheme using alternate, inverted sine symbols for the color difference values.

DETAILED DESCRIPTION OF THE PREFERRED EMBODIMENTS

FIG. 1A shows the luminance values Y for a color picture. Each value of Y could correspond to a single pixel or to a group of pixels. FIG. 1B shows the chrominance values assigned to each group of four luminance values. Thus, if each luminance value corresponds to a single pixel, each chrominance value is averaged over four pixels. This results in the color difference signals shown in FIG. 1. As can be seen, two color difference signals are required for each group of four luminance values. This method is used because luminance is more discernible to the human eye than color, and thus less color information is needed.

The requirement for less color difference signals allows the modulation scheme of FIG. 2 to be used. An inphase channel, (I), contains the luminance information. Each one of the sine wave symbols in intervals 12, 14, 16, 18, etc. corresponds to a single pixel. In the Q channel, the color difference value is encoded as a cosine symbol occurring in every other interval, intervals 12, 16, etc. The intervening intervals, i.e. 14 and 18, have the value of zero such that, in the combined I plus Q channel, the zero crossing between each interval present on the I channel is preserved.

In addition, every other cosine symbol is inverted so that the cosine symbol in interval 12 is a first phase and the cosine symbol in interval 16 is inverted to be 180° out of phase. Since these two symbols correspond to neighboring pixels, it is likely that the color difference values will be the same or similar, so that the average value of these two symbols over time is approximately zero.

Thus, when the I plus Q signal is received by a single channel demodulator, such as that shown in U.S. Pat. No. 4,739,413, hereby incorporated by reference, the Q channel is filtered out so that the demodulator sees only the I channel. Since the I channel contains luminance values, this will be interpreted as a simple black and white picture.

These channels are shown in FIG. 2B with the I channel containing a sync signal and then the luminance values in succession. The Q channel contains a sync signal and the color difference, or C, symbols every other position. In addition, the alternate symbols which are present are inverted as indicated by the superscript line above the C values.

For a video telephone which has color capabilities, the QAM signal is demodulated using a demodulator such as that shown in copending application serial no. 212,549, entitled "Quadrature Amplitude Modulation with Line Synchronization Pulse for Video Telephone", filed June 28, 1988, and hereby incorporated herein by reference. To avoid interference, the maximum value of the cosine symbols in the Q channel of FIG. 2A is one-half of the maximum value of the sine symbols on the I channel.

FIGS. 3A-3F illustrate an alternate method according to the present invention. FIG. 3A shows the luminance values on an I channel similar to the I channel of FIG. 2A. FIG. 3B shows the Q channel containing the color information which has a cosine symbol assigned to every interval. However, two redundant cosine symbols are used for each group of pixels, with one of the cosine symbols being inverted. For example, a cosine symbol 20 is followed by its inverted redundant pair 22. The combined QAM signal is shown in FIG. 3C. Each cosine symbol in FIG. 3B is DC shifted to move the zero-crossing points so that they line up with the zero crossing points of the sine wave of FIG. 3A. Symbol 20, the non-inverted symbol, is shifted by +K. Thus, instead of a first zero-crossing at time 21, the first zero-crossing is shifted to time 23, which is lined up with the first zero-crossing of FIG. 3A. Symbol 22, the inverted symbol, is shifted by −K. The constant K is the maximum cosine value, which could be 1, for instance. The actual zero crossing points in between symbols has been shifted, but, when the cosine symbols of FIG. 3B are averaged out, the zero crossings remain intact. By using a plus and minus raised cosine signal (+/−1−/+cosine X) for FIG. 3B, the zero value is adjusted at the interval boundaries, such as boundary 24, so that the zero crossing of that boundary in the combined signal is not affected. Without the addition of the constant value, the zero crossing point would instead be a higher or lower value.

FIG. 4 is a diagram of the I and Q channels for an embodiment of the invention using sine symbols for the color difference values. The luminance values are provided by sine signals which appear in every interval, i.e. intervals 26, 28, 30, 32 and 34. The color difference values are encoded on the Q channel as sine wave symbols 36, 38, 40, etc. Alternate symbols are inverted, so that symbol 38 is inverted with respect to symbols 36 and 40. This averages out the shifting of the zero crossings on the I channel since symbol 36 will cause zero crossings in the middle and at the end of interval 26 to shift in a first direction, while symbol 38 will cause the zero crossings at the middle and end of interval 30 to shift in the opposite direction. In addition, the zero crossings in between symbols 36 and 38, 38 and 40, etc. are unaffected and thus preserved. By using a sine wave symbol, not only are the edges of each symbol at the zero level, so that they do not cause crosstalk on the I channel, the symbol end points are not at a zero crossing, and thus will not produce crosstalk at such a zero crossing. Thus, the color difference sine wave symbols need not be half the amplitude of the I channel symbols, as for the embodiment of FIG. 2A.

The luminance information can be recovered by a normal chopper demodulation method (in phase with the luminance carrier). The color information can be recovered by a chopper demodulation of the signal using a signal 90° out of phase with the luminance component or by signal that is half the carrier frequency (see FIGS. 3E and 3F).

The QAM signal can be recovered using the demodulator shown in FIG. 5 of the above-referenced copending application. The demodulator can contain a pair of chopper demodulators for the luminance and chromo channels, respectively. The output of the chopper demodulator for the luminance channel as shown in FIG. 3D, in the output for the chrominance channel is shown in FIG. 3E where a signal 90° out of phase with the luminance component is used. FIG. 3F shows the output of the chopper demodulator for the chrominance channel when a signal that is half the carrier frequency is used.

The modulated values can be produced by simple look-up table as shown in the above referenced Luma Telecom patent.

As will be understood by those familiar with the art, the present invention can be embodied in other specific forms without departing from the spirit or essential characteristics thereof. For example, each luminance symbol could be assigned to a group of neighboring pixels, rather than a single pixel. Accordingly, the disclosure of the preferred embodiments of the invention is intended to be illustrative, but not limiting, of the scope of the invention which is set forth in the following claims.

What is claimed is:

1. A method for transmitting color information using two channels so that inter-symbol zero crossings of a first channel are preserved in the combined signal, comprising:
   assigning each cycle of a sine wave on said first channel as a symbol representing the luminance of at least one pixel;
   assigning single cycles on a second channel as symbols representing color difference values, said color difference symbols being single cycles of a sine wave, said color difference symbols starting at every other luminance symbol and being 90° out of phase with said first channel sine wave;
   inverting alternate ones of said color difference symbols; and
   combining said symbols on said first and second channels to produce said combined signal, 2. An apparatus for transmitting color information using two channels so that inter-symbol zero crossings of a first channel are preserved in the combined signal, comprising:

means for assigning each cycle of a sine wave on said first channel as a symbol representing the luminance of at least one pixel;

means for assigning single cycle on a second channel as symbols representing color difference values and inverting alternate ones of said symbols, said color difference symbols being single cycles of a sine wave, said color difference symbols starting at every other luminance symbol and being 90° out of phase with said first channel sine wave; and means for combining said symbols on said first and second channels to produce said combined signal, 3. A method for transmitting color information using two channels so that inter-symbol zero crossings of a first channel are preserved in the combined signal, comprising:

assigning each cycle of a sine wave on said first channel as a symbol representing the luminance of at least one pixel;

assigning single cycles of a cosine wave on a second channel as symbols representing color difference values with two successive cosine symbols being assigned to the same group of pixels;

inverting alternate ones of said color difference symbols, such that each group of pixels is represented by a noninverted and an inverted cosine symbol;

adding a constant DC value to each said cosine symbol to cause the zero crossings of said second channel to match the zero crossings of said first channel; and combining said symbols on said first and second channels to produce said combined signal.

4. A method for transmitting color information using two channels so that inter-symbol zero crossings of a first channel are preserved in the combined signal, comprising:

assigning each cycle of a sine wave on said first channel as a symbol representing the luminance of at least one pixel;

assigning single cycles of a cosine wave on a second channel as symbols representing color difference values, said cosine symbols being combined with every other sine symbol to form said combined signal, each group of pixels being assigned only one cosine symbol;

inverting alternate ones of said color difference cosine symbols; and combining said symbols on said first and second channels to produce said combined signal.

5. The method of claim 4, wherein a maximum value for said cosine symbols is less than a maximum value for said sine symbols.

6. The method of claim 5 wherein said maximum cosine symbol value is approximately half said maximum sine symbol value.

7. An apparatus for transmitting color information using two channels so that inter-symbol zero crossings of a first channel are preserved in the combined signal, comprising:

means for assigning each cycle of a sine wave on said first channel as a symbol representing the luminance of at least one pixel;

means for assigning single cycles of a cosine wave on a second channel as symbols representing color difference values and inverting alternate some of said symbols, with two successive cosine symbols being assigned to the same group of pixels such that each group of pixels is represented by a noninverted and an inverted cosine symbol;

means for adding a constant DC value to each said cosine symbol to cause the zero crossings of said second channel to match the zero crossings of said first channel; and means for combining said symbols on said first and second channels to produce said combined signal.

8. An apparatus for transmitting color information using two channels so that inter-symbol zero crossings of a first channel are preserved in the combined signal, comprising:

means for assigning each cycle of a sine wave on said first channel as a symbol representing the luminance of at least one pixel;

means for assigning single cycles of a cosine wave on a second channel as symbols representing color difference values and inverting alternate ones of said symbols, said cosine symbols being combined with every other sine symbol to form said combined signal, each group of pixels being assigned only one cosine symbol; and means for controlling said symbols on said first and second channels to produce said combined signal, 9. The apparatus of claim 8 wherein a maximum value for said cosine symbols is less than a maximum value for said sine symbols.

10. The apparatus of claim 9 wherein said maximum cosine symbol value is approximately half said maximum sine symbol value.

* * * * *